United States Patent
Clancy et al.

(10) Patent No.: US 10,114,750 B2
(45) Date of Patent: Oct. 30, 2018

(54) PREVENTING THE DISPLACEMENT OF HIGH TEMPORAL LOCALITY OF REFERENCE DATA FILL BUFFERS

(75) Inventors: Robert D. Clancy, Cary, NC (US); Thomas Philip Speier, Raleigh, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 13/451,010

(22) Filed: Apr. 19, 2012

(65) Prior Publication Data

US 2013/0191559 A1    Jul. 25, 2013

Related U.S. Application Data

(60) Provisional application No. 61/589,577, filed on Jan. 23, 2012.

(51) Int. Cl.
*G06F 3/06* (2006.01)
*G06F 12/0855* (2016.01)
*G06F 12/0882* (2016.01)

(52) U.S. Cl.
CPC ...... *G06F 12/0859* (2013.01); *G06F 12/0882* (2013.01); *G06F 2212/1028* (2013.01); *Y02D 10/13* (2018.01)

(58) Field of Classification Search
CPC combination set(s) only.
See application file for complete search history.

(56) References Cited

U.S. PATENT DOCUMENTS

| | | | |
|---|---|---|---|
| 5,473,764 A | 12/1995 | Chi | |
| 5,822,757 A | 10/1998 | Chi | |
| 6,192,449 B1 | 2/2001 | Circello et al. | |
| 7,278,136 B2 * | 10/2007 | Moritz et al. | 717/152 |
| 7,853,762 B2 | 12/2010 | Lee et al. | |
| 8,135,899 B1 * | 3/2012 | Dobrovolskiy et al. | 711/6 |
| 8,386,717 B1 * | 2/2013 | Banerjee | G06F 12/123 |
| | | | 711/118 |
| 2001/0013087 A1 * | 8/2001 | Ronstrom | 711/133 |
| 2003/0110357 A1 | 6/2003 | Nguyen et al. | |

(Continued)

FOREIGN PATENT DOCUMENTS

| | | |
|---|---|---|
| CN | 102073596 A | 5/2011 |
| CN | 102103488 A | 6/2011 |

(Continued)

OTHER PUBLICATIONS

Dan et al., "Use of Secondary Address Stack and Multiple Insertion Points for Database Buffer Management under Least Recently Used policy", Jul. 1993, IBM Technical Disclosure Bulletin, vol. 36, No. 07, pp. 431-432.*

(Continued)

*Primary Examiner* — Ilwoo Park
(74) *Attorney, Agent, or Firm* — Muncy, Geissler, Olds & Lowe

(57) ABSTRACT

The disclosure relates to accessing memory content with a high temporal locality of reference. An embodiment of the disclosure stores the content in a data buffer, determines that the content of the data buffer has a high temporal locality of reference, and accesses the data buffer for each operation targeting the content instead of a cache storing the content.

25 Claims, 4 Drawing Sheets

(56) References Cited

U.S. PATENT DOCUMENTS

| | | |
|---|---|---|
| 2005/0223153 A1 | 10/2005 | O'connor |
| 2007/0247929 A1* | 10/2007 | Wallner et al. .......... 365/189.05 |
| 2009/0313612 A1 | 12/2009 | Vick et al. |
| 2010/0146212 A1 | 6/2010 | Cohen et al. |
| 2010/0153630 A1* | 6/2010 | Yim et al. .................... 711/103 |
| 2011/0153928 A1* | 6/2011 | Avudaiyappan et al. ..... 711/109 |
| 2011/0154002 A1 | 6/2011 | Liu et al. |
| 2011/0271070 A1* | 11/2011 | Worthington et al. ....... 711/165 |
| 2012/0017039 A1* | 1/2012 | Margetts ....................... 711/105 |
| 2012/0066473 A1* | 3/2012 | Tremaine et al. ............ 711/206 |
| 2012/0117304 A1* | 5/2012 | Worthington et al. ....... 711/103 |
| 2016/0116965 A1* | 4/2016 | Wu ....................... G06F 1/3287 |
| | | 713/320 |

FOREIGN PATENT DOCUMENTS

| | | |
|---|---|---|
| JP | H10187540 A | 7/1998 |
| JP | H1145180 A | 2/1999 |
| JP | 2001290702 A | 10/2001 |
| JP | 2006185335 A | 7/2006 |
| JP | 2008181399 A | 8/2008 |

OTHER PUBLICATIONS

International Search Report and Written Opinion—PCT/US2013/022775—ISA/EPO—Jun. 5, 2013.

\* cited by examiner

PREVENTING THE DISPLACEMENT OF HIGH TEMPORAL LOCALITY OF REFERENCE DATA FILL BUFFERS

The present application for patent claims priority to Provisional Application No. 61/589,577 entitled "PREVENTING THE DISPLACEMENT OF HIGH TEMPORAL LOCALITY OF REFERENCE DATA FILL BUFFERS" filed Jan. 23, 2012, and assigned to the assignee hereof and hereby expressly incorporated by reference herein.

FIELD OF DISCLOSURE

This disclosure relates to power management of a microprocessor, and more particularly, to preventing the displacement of high temporal locality of reference data fill buffers.

BACKGROUND

During the execution of loads and stores within the context of a microprocessor, data patterns arise in which a relatively small window of memory is written to and read from at a heightened frequency. Such a memory region is said to have a high temporal locality of reference. One example is the software stack—the stack is constantly being pushed to and pulled from as procedures are called and returned from.

Memory regions with a high temporal locality of reference require more power than regions with lower temporal locality of reference because these regions of memory are often marked as cacheable in the page table, and therefore each push to the stack could result in a significant power draw whenever the large cache structure is written. Further, it is disadvantageous to keep cache fill buffers allocated for regions of memory that do not have a high temporal locality of reference, as fill buffer availability generally translates into throughput for a storage-unit. Additionally, if the lifecycle of the fill buffers is not managed, the allocation and de-allocation of multiple fill buffers for the same region of memory will over time introduce further power issues.

This is an issue in the context of power-critical spaces, such as the microprocessor of a mobile device. Power profiles of microprocessors have become increasingly critical as the demand for longer battery life in mobile devices has elevated.

SUMMARY

The disclosure relates to accessing memory content with a high temporal locality of reference. An embodiment of the disclosure stores the content in a data buffer, determines that the content of the data buffer has a high temporal locality of reference, and accesses the data buffer for each operation targeting the content instead of a cache storing the content.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
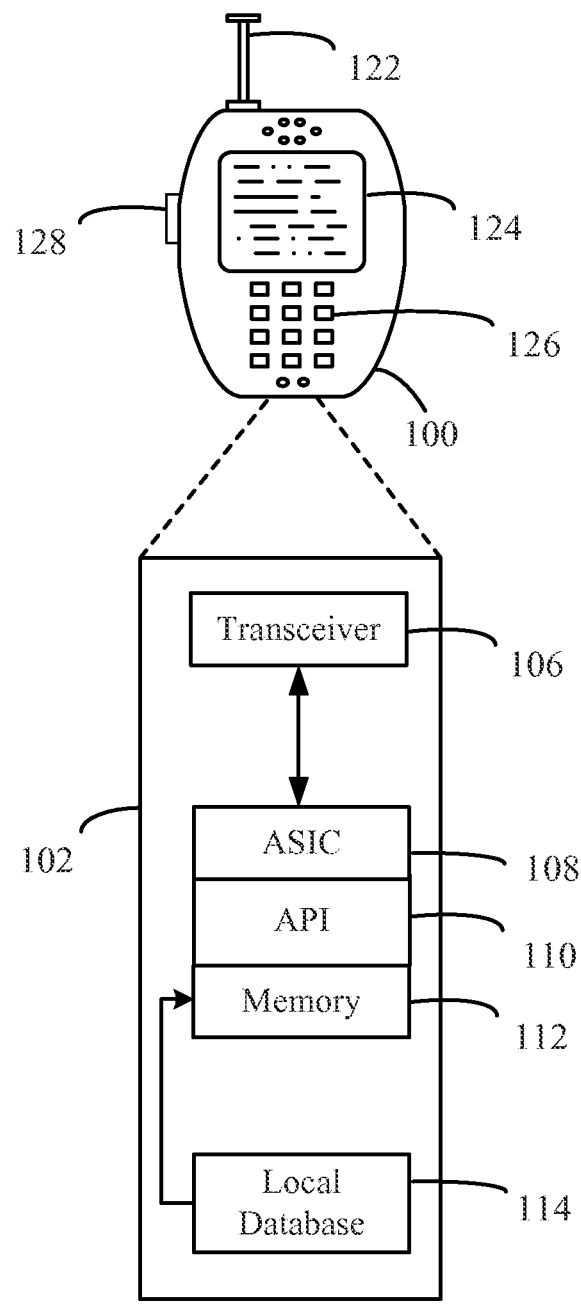
FIG. 1 illustrates an exemplary user equipment (UE) in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

In the description herein, the term "write" is used synonymously with "store" operations as is known in the art. Likewise, the term "read" is used synonymously with "load." Further, in the description, references may be made to read/write operations pertaining to "cache blocks," which may refer to a granularity less than that of an entire cache line. However, it will be understood that such references are merely for illustrative purposes and shall not be construed as limiting the scope of the embodiments. For example, disclosed techniques may be easily extended to operations on any other granularity as applicable, such as a cache word, cache line, etc. Further, it will also be understood that the referenced cache block may comprise data or instructions, even though the description may be provided in terms of write/read operations of data alone. Additionally, references to lower levels of memory hierarchy may include backing storage elements beyond local or first level (L1) caches which may be associated with processors or processing elements. For example, references to lower levels memory hierarchy herein, may refer to second level (L2) caches, main memory, and one or more levels of memory structures which may be present between L2 caches and main memory.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

It will be appreciated that configured logic or "logic configured to" are not limited to specific logic gates or elements, but generally refer to the ability to perform the functionality described herein (either via hardware or a combination of hardware and software). Thus, the configured logics or "logic configured to" are not necessarily implemented as logic gates or logic elements despite sharing the word "logic." Other interactions or cooperation between the logic in the various blocks will become clear to one of ordinary skill in the art from a review of the embodiments described below in more detail.

Referring to FIG. 1, a UE 100, (here a wireless device), such as a cellular telephone, has a platform 102 that can receive and execute software applications, data and/or commands transmitted from a radio access network (RAN) that may ultimately come from the core network, the Internet and/or other remote servers and networks. The platform 102 can include a transceiver 106 operably coupled to an "ASIC" 108, or other processor, microprocessor, logic circuit, or other data processing device. The ASIC 108 or other processor executes the application programming interface ("API") 110 layer that interfaces with any resident programs in the memory 112 of the wireless device. The memory 112 can be comprised of read-only or random-access memory (RAM and ROM). EEPROM, flash cards, or any memory common to computer platforms. The platform 102 also can include a local database 114 that can hold applications not actively used in memory 112. The local database 114 is typically a flash memory cell, but can be any secondary storage device as known in the art, such as magnetic media, EEPROM, optical media, tape, soft or hard disk, or the like. The internal platform 102 components can also be operably coupled to external devices such as antenna 122, display 124, push-to-talk button 128 and keypad 126 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 108, memory 112, API 110 and local database 114 may all be used cooperatively to load, store and execute the various functions disclosed herein and thus the logic to perform these functions may be distributed over various elements. Alternatively, the functionality could be incorporated into one discrete component. Therefore, the features of the UE 100 in FIG. 1 are to be considered merely illustrative and the invention is not limited to the illustrated features or arrangement.

The wireless communication between the UE 100 and the RAN can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 2:
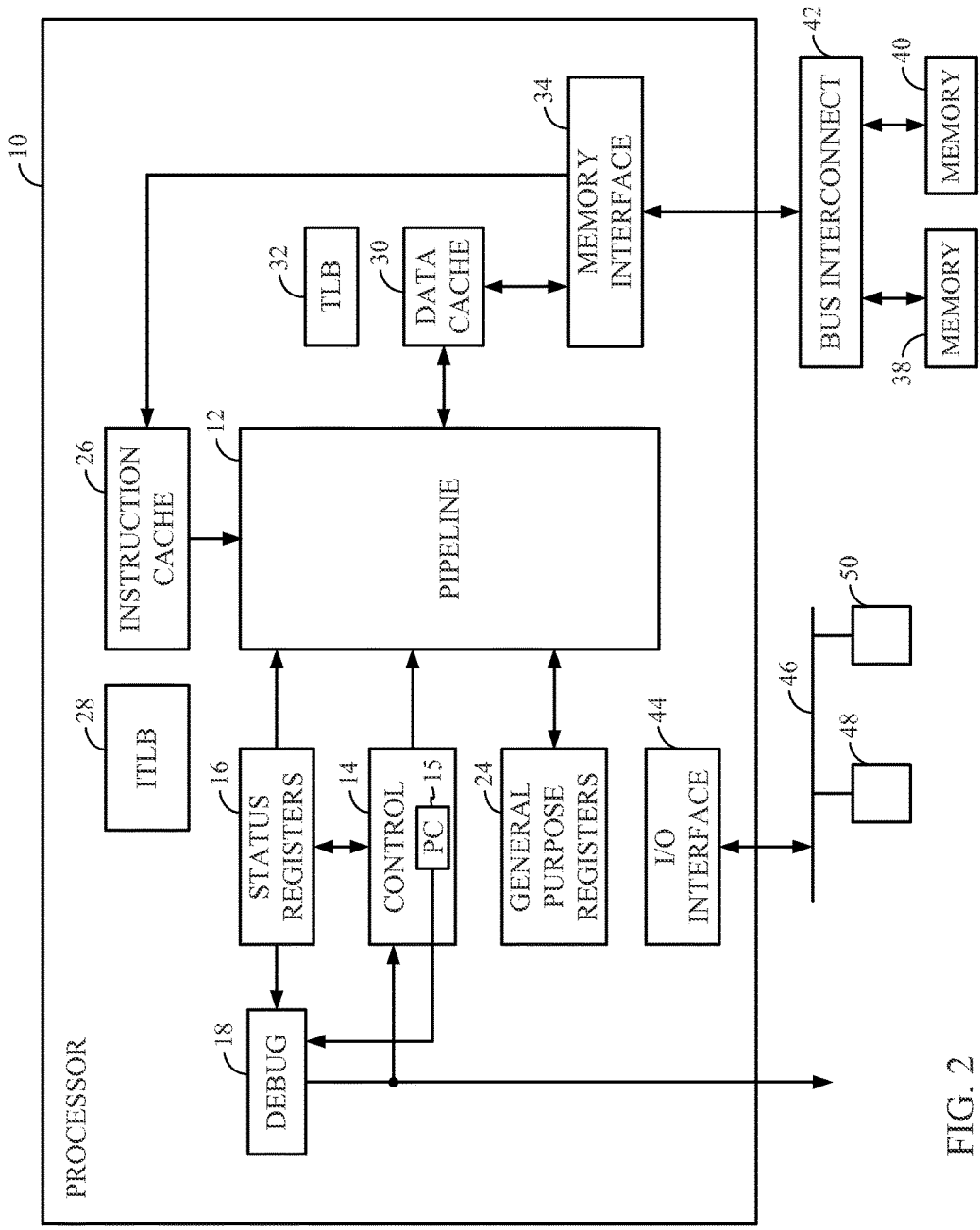
FIG. 2 illustrates a simplified block diagram of an exemplary processor in accordance with at least one embodiment of the invention.

FIG. 2 depicts a simplified functional block diagram of a processor 10, such as ASIC 108. The processor 10 executes instructions in an instruction execution pipeline 12 according to control logic 14. The control logic 14 maintains a Program Counter (PC) 15, and sets and clears bits in one or more status registers 16 to indicate, e.g., the current instruction set operating mode, information regarding the results of arithmetic operations and logical comparisons (zero, carry, equal, not equal), and the like. In some embodiments, the pipeline 12 may be a superscalar design, with multiple, parallel pipelines. The pipeline 12 may also be referred to as an execution unit. A General Purpose Register (GPR) file 24 provides registers accessible by the pipeline 12, and comprising the top of the memory hierarchy.

The processor 10, which executes instructions from at least two instruction sets in different instruction set operating modes, additionally includes a debug circuit 18, operative to compare, upon the execution of each instruction, at least a predetermined target instruction set operating mode to the current instruction set operating mode, and to provide an indication of a match between the two. The debug circuit 18 is described in greater detail below.

The pipeline 12 fetches instructions from an instruction cache (I-cache) 26, with memory address translation and permissions managed by an Instruction-side Translation Lookaside Buffer (ITLB) 28. Data is accessed from a data cache (D-cache) 30, with memory address translation and permissions managed by a main Translation Lookaside Buffer (TLB) 32. In various embodiments, the ITLB 28 may comprise a copy of part of the TLB 32. Alternatively, the ITLB 28 and TLB 32 may be integrated. Similarly, in various embodiments of the processor 10, the I-cache 26 and D-cache 30 may be integrated, or unified. Further, I-cache 26 and D-cache 30 may be L1 caches. Misses in the I-cache 26 and/or the D-cache 30 cause an access to main (off-chip) memory 38, 40 by a memory interface 34. The memory interface 34 may be a master input to a bus interconnect 42 implementing a shared bus to one or more memory devices 38, 40. Additional master devices (not shown) may additionally connect to the bus interconnect 42.

The processor 10 may include an Input/Output (I/O) interface 44, which may be a master device on a peripheral bus 46, across which the I/O interface 44 may access various peripheral devices 48, 50. Those of skill in the art will recognize that numerous variations of the processor 10 are possible. For example, the processor 10 may include a second-level (L2) cache for either or both the I and D caches 26, 30. In addition, one or more of the functional blocks depicted in the processor 10 may be omitted from a particular embodiment. Other functional blocks that may reside in the processor 10, such as a JTAG controller, instruction predecoder, branch target address cache, and the like are not germane to a description of the present invention, and are omitted for clarity.

During the execution of loads and stores within the context of a microprocessor, data patterns arise in which a relatively small window of memory is written to and read from at a heightened frequency. Such a memory region is said to have a high temporal locality of reference. One example is the software stack the stack is constantly being pushed to and pulled from as procedures are called and returned from.

Memory regions with a high temporal locality of reference present a challenge to the power utilization of the core. This challenge exists because these regions of memory are often marked as cacheable in the page table, and therefore each push to the stack could result in a significant power draw whenever the large cache structure is written. To complicate the problem, it is strictly disadvantageous to keep cache fill buffers allocated for regions of memory that do not have a high temporal locality of reference, as fill buffer availability generally translates into throughput for a storage-unit. Additionally, if the life-cycle of the fill buffers is not managed, the allocation and de-allocation of multiple fill buffers for the same region of memory will over time introduce further power issues.

This is an issue in the context of power-critical spaces, such as the microprocessor of a mobile device. Power profiles of microprocessors have become increasingly critical as the demand for longer battery life in mobile devices has elevated.

An embodiment of the invention addresses these and other issues by detecting regions of memory with a high temporal locality of reference, preventing writes to the cache for each store operation targeting the region, and preventing the constant allocation and de-allocation of buffers for the same region of memory. An embodiment of the invention writes to a fill buffer instead of the cache. By writing only to the fill buffer, the power associated with accessing the large cache structure is saved. By also keeping the fill buffer from retiring, the allocation and de-allocation of new fill buffers for the same region of memory is prevented. Meanwhile, instructions-per-cycle (IPC) is not reduced because the fill buffer data stays accessible to loads such that the load-use penalty does not change. Additionally, the fill buffers stay mostly available for accesses that do not have high temporal locality of reference since the one(s) marked as having high temporal locality manage their own retirement by watching stack pointer events and/or tracking how often the fill buffer is accessed.

Figure 3:
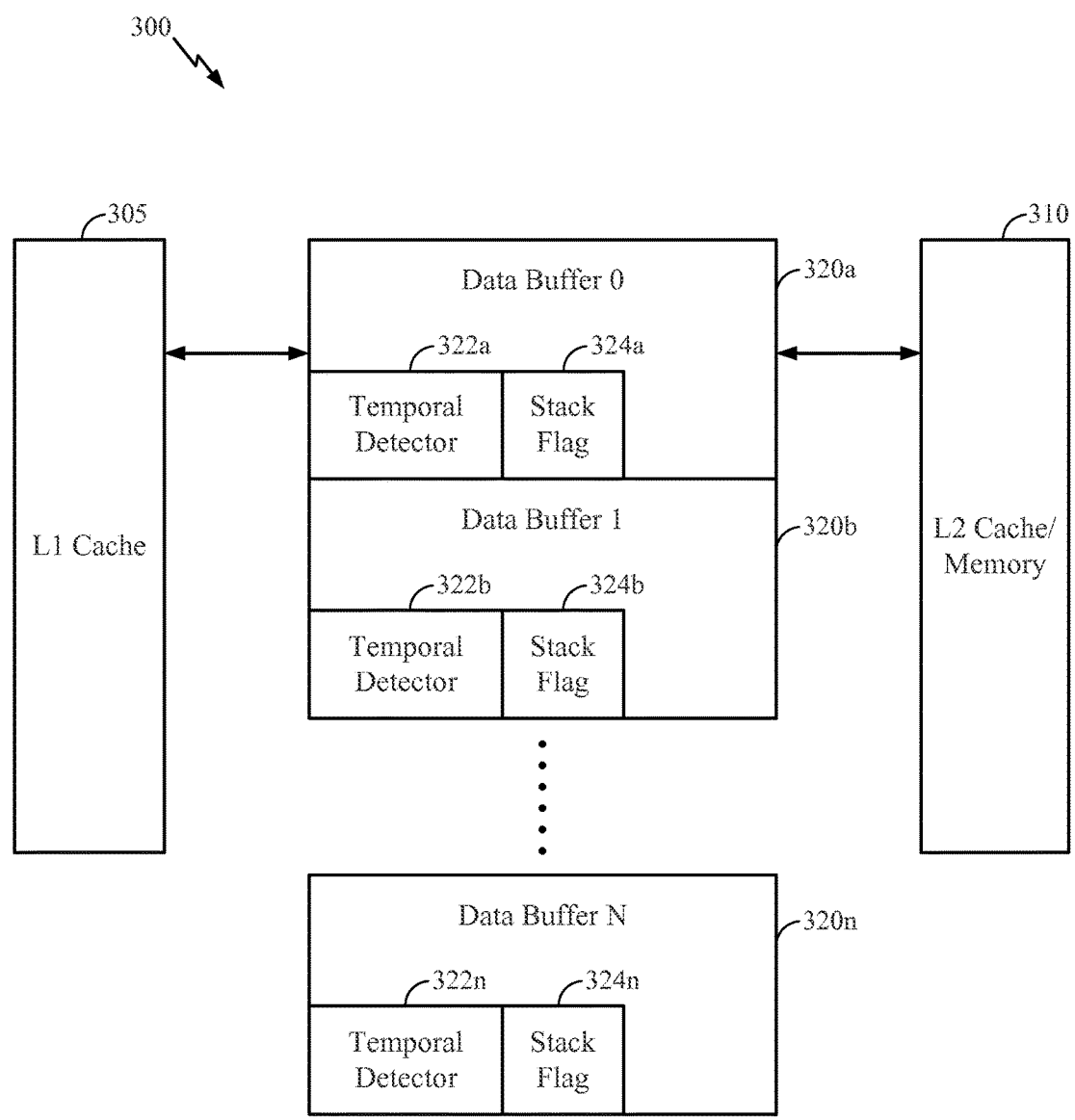
FIG. 3 illustrates a simplified block diagram of an exemplary memory structure in accordance with at least one embodiment of the invention.

FIG. 3 illustrates a simplified block diagram of an exemplary memory structure 300 in accordance with an embodiment of the invention. Memory structure 300 contains a first level (L1) cache 305 and a second level (L2) cache and/or other higher-level memory 310. Memory structure 300 also contains data buffers 0 to N (shown as buffers 320a, b, and n). There may be any number of data buffers between data buffer 320b and data buffer 320n, as indicated by the dotted line. Each data buffer 320a, b, and n includes a temporal detector field 322a, b, and n, respectively, and/or a stack flag field 324 a, b, and n, respectively. Data may be written to or from first level (L1) cache 305 to or from, for example, data buffer 320a. Likewise, data may be written to or from cache/memory 310 to or from, for example, data buffer 320a. Data may be written to or from any available data buffer 0-N and data need not be written to or from cache 305 and/or cache/memory 310 to or from the same data buffer.

An embodiment of the invention recognizes load and store operations associated with regions of memory that have a high temporal locality of reference and distinguishes them from load and store operations that are not associated with regions of memory that have a high temporal locality of reference. An embodiment of the invention manages the associated data cache fill buffers according to their temporal locality of reference.

For example, a technique for determining a high temporal locality of reference is to recognize when an operation is associated with the stack. In the advanced RISC (reduced instruction set computer) machine (ARM) architecture, the stack pointer is kept in register 14 (R14) of the general purpose register file, and so an embodiment of the invention detects when R14 is used as a base register for loads and stores, e.g. loads and stores to the fill buffer. This identification is presented to the storage unit as an attribute of the operation. The storage unit flags the data cache fill buffer as having a high temporal locality by, for example, setting a flag in a field of the fill buffer, such as stack flag field 324a, b, or n of FIG. 3. The store is performed to the fill buffer, but not the cache, regardless of whether the memory resides in the cache. To account for the stale data in the cache, the fill buffer must be made as accessible as the cache itself in order to maintain the performance of loads from the stack. In addition to not writing to the cache, the fill buffer's life-cycle is extended such that the fill buffer(s) for this region of memory is not allocated and de-allocated continuously. The data fill buffer then detects system events (events other than pushes/pops) that cause the stack pointer to change, reacts accordingly by removing its high temporal locality status, and retires as normal fill buffers do.

Another technique for identifying regions of memory that have a high temporal locality of reference, which may or may not be used in conjunction with the above-described technique, is for each fill buffer to monitor how often it is stored to or loaded from and to mark fill buffers that are accessed with increased frequency as having a high temporal locality of reference. The fill buffer would then continue to track how often it is accessed and remove its high temporal locality status as the activity associated with that fill buffer subsides.

For example, the fill buffer may track how often it is accessed with a counter stored in a field of the fill buffer, for example, temporal detector field 322a, b, or n of FIG. 3. When a fill buffer is allocated, its counter may initially be set to 10, if the fill buffer is not accessed within an exemplary 100 clock cycles, the counter would be decremented to 9. If the fill buffer was not accessed within the next 100 cycles, the counter would be decremented to 8, and so on. On the other hand, if the fill buffer was accessed at least once within the 100 cycles, the counter would be incremented to 11. Likewise, if the fill buffer was accessed at least once within the next 100 cycles, the counter would be incremented to 12, and so on. This way, any fill buffer with a counter value above 10 would be considered to have a high temporal locality of reference and would not be de-allocated when it otherwise would be. On the other hand, any fill buffer with a counter value below 10 would be considered to not have a high temporal locality of reference and would be de-allocated as it normally would be.

It is apparent that setting the initial value of the counter to 10 and the number of clock cycles to 100 is an example only. There are any numbers of other possibilities, and they may depend on the particular processor implementing an embodiment of the invention. That is, these boundaries may be different for different processors, and may also be adjusted over time to optimize the power management of the processor. For example, if the initial boundaries do not provide sufficient power management, the counter and/or the number of cycles may be decreased to prevent fill buffers with a high temporal locality of reference from being de-allocated too soon. That is, if the counter and/or number of cycles are set too high, performance may decrease because none of the fill buffers would be treated as having a high temporal locality of reference.

Because the counter and cycle thresholds may need to be changed, they should be configurable values. That is, the values should be stored in one or more registers and be configurable by software. In that way, a fill buffer can determine whether it has a high temporal locality of reference by comparing its counter and the number of clock cycles to the registers storing the counter and/or the clock cycle boundaries.

Figure 4:
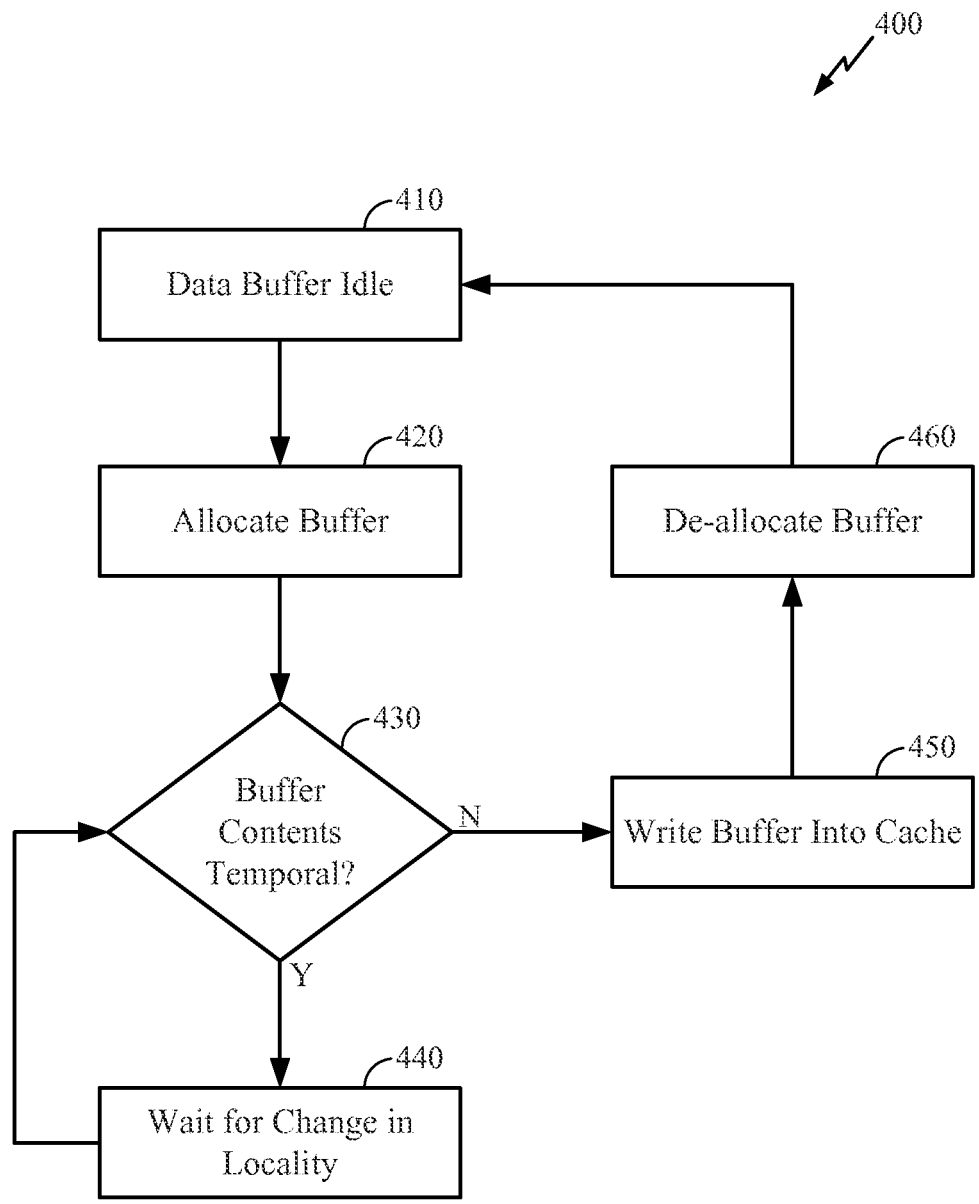
FIG. 4 illustrates an exemplary flowchart in accordance with at least one embodiment of the invention.

FIG. 4 illustrates an exemplary flowchart 400 in accordance with at least one embodiment of the invention. At 410, a data fill buffer is idle, that is, not allocated. At 420, the data buffer is allocated and filled with data. This allocation may include initializing a temporal detector counter as described above. At 430, it is determined whether or not the contents of the fill buffer have a high temporal locality of reference. As described above, this may include determining whether the value of a counter is above a particular threshold and/or whether register R14 is being used as a base register for a load or store to the fill buffer. If it is determined in 430 that the contents of the fill buffer do not have a high temporal locality of reference, then at 450, the contents of the buffer are written to the cache, e.g. cache 305. At 460, the fill buffer is de-allocated and returns to an idle state at 410.

If it is determined in 430 that the contents of the fill buffer do have a high temporal locality of reference, then the fill buffer is not subsequently de-allocated, but rather waits for any change to its temporal locality of reference at 440. This would include, for example, decrementing the value of the counter since that would indicate a possible change in the temporal locality of reference. Later, when the counter is decremented due to the lack of use of the buffer, for example, or the stack pointer changes, the fill buffer again determines at 430 whether or not its contents have a high temporal locality of reference, then proceeds to 440 or 450 as appropriate.

As shown by the loop of 430 and 440, the same data may be stored in the allocated fill buffer for a number of cycles. This is data that would otherwise be written to the cache and the fill buffer de-allocated, as in 450 and 460. That is, if the data allocated in 420 has a high temporal locality of reference as determined in 430, it will remain in the fill buffer until it no longer has a high temporal locality of reference (440). In that way, any loads or stores of frequently accessed data will be accessed from the fill buffer instead of the cache.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for preventing displacement of high temporal locality fill buffers. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of accessing memory content with a high temporal locality of reference, comprising:
    storing the memory content in a data buffer of a processor, the data buffer coupled to a cache of the processor so that data may be written from the data buffer to the cache and from the cache to the data buffer;
    initializing a counter associated with the data buffer;
    incrementing the counter when the memory content in the data buffer is accessed within a predetermined number of clock cycles;
    decrementing the counter when the memory content in the data buffer is not accessed within the predetermined number of clock cycles;
    determining that the memory content of the data buffer has the high temporal locality of reference when the counter is above a threshold; and
    accessing the data buffer, instead of the cache, for each operation targeting the memory content when the counter is above the threshold.

2. The method of claim 1, further comprising:
    preventing a de-allocation of the memory content in the data buffer when the counter is above the threshold; and
    when the counter falls below the threshold, storing the memory content in the cache and de-allocating the memory content in the data buffer.

3. The method of claim 1, further comprising:
    accessing the data buffer, instead of the cache, for load and store operations, performed by the processor, targeting the memory content when the counter is above the threshold.

4. The method of claim 1, further comprising:
    preventing a write to the cache for each store operation, performed by the processor, targeting the memory content when the counter is above the threshold.

5. The method of claim 1, wherein the cache comprises at least one of a first level (L1) cache of the processor or a second level (L2) cache of the processor.

6. A method of accessing memory content with a high temporal locality of reference, comprising:
  storing the memory content in a data buffer of a processor, the data buffer coupled to a cache of the processor so that data may be written from the data buffer to the cache and from the cache to the data buffer;
  determining that a register containing a stack pointer is used as a base register for loads and stores associated with the memory content;
  in response to the determination that the register containing the stack pointer is used as the base register for loads and stores, setting a flag associated with the memory content in the data buffer to indicate that the memory content in the data buffer has the high temporal locality of reference; and
  accessing the data buffer, instead of the cache, for each operation targeting the memory content when the flag indicates that the memory content in the data buffer has the high temporal locality of reference.

7. The method of claim 6, further comprising:
  preventing a de-allocation of the memory content in the data buffer when the flag indicates that the memory content in the data buffer has the high temporal locality of reference.

8. The method of claim 6, further comprising:
  removing the flag indicating the high temporal locality of reference in response to the stack pointer changing due to a system event other than a push operation or pop operation on a stack.

9. The method of claim 8, further comprising:
  when the flag is removed, storing the memory content in the cache and de-allocating the data buffer.

10. A processor, comprising:
  a memory structure comprising a data buffer and a cache, wherein the processor is configured to:
  store memory content in the data buffer, the data buffer coupled to the cache so that data may be written from the data buffer to the cache and from the cache to the data buffer;
  initialize a counter associated with the memory content in the data buffer;
  increment the counter when the memory content in the data buffer is accessed within a predetermined number of clock cycles;
  decrement the counter when the memory content in the data buffer is not accessed within the predetermined number of clock cycles;
  determine that the memory content of the data buffer has a high temporal locality of reference when the counter is above a threshold; and
  access the data buffer, instead of the cache, for each operation targeting the memory content when the counter is above the threshold.

11. The processor of claim 10, wherein the processor is further configured to:
  prevent a de-allocation of the memory content in the data buffer when the counter is above the threshold; and
  store, when the counter falls below the threshold, the memory content in the cache and de-allocating the memory content in the data buffer.

12. The processor of claim 10, wherein the cache comprises an instruction cache, and wherein the memory content includes instructions, the processor further comprising:
  a pipeline coupled to the memory structure; and
  an instruction-side translation lookaside buffer (ITLB), wherein the pipeline is configured to fetch the instructions from the instruction cache with memory address translation and permissions managed by the ITLB.

13. The processor of claim 10, wherein the cache comprises data cache, and wherein the memory content includes data, the processor further comprising:
  a pipeline coupled to the memory structure; and
  a main translation lookaside buffer (TLB), wherein the pipeline is configured to access the data from the data cache with memory address translation and permissions managed by the TLB.

14. A processor, comprising:
  a memory structure comprising a data buffer and a cache, wherein the processor is configured to:
  store memory content in the data buffer, the data buffer coupled to the cache so that data may be written from the data buffer to the cache and from the cache to the data buffer;
  determine that a register containing a stack pointer is used as a base register for loads and stores associated with the memory content;
  set, in response to the determination that the register containing the stack pointer is used as the base register for loads and stores, a flag associated with the memory content in the data buffer to indicate that the memory content in the data buffer has a high temporal locality of reference; and
  access the data buffer, instead of the cache, for each operation targeting the memory content when the flag indicates that the memory content in the data buffer has the high temporal locality of reference.

15. The processor of claim 14, wherein the processor is further configured to:
  prevent a de-allocation of the memory content in the data buffer when the flag indicates that the memory content in the data buffer has the high temporal locality of reference.

16. The processor of claim 14, wherein the processor is further configured to:
  remove the flag indicating the high temporal locality of reference in response to detecting a system event other than a push operation or a pop operation on a stack that causes the stack pointer to change.

17. The processor of claim 16, wherein the processor is further configured to:
  store, when the flag is removed, the memory content in the cache and de-allocating the memory content in the data buffer.

18. A processor, comprising:
  a memory structure comprising a data buffer and a cache;
  means for storing memory content in the data buffer, the data buffer coupled to the cache so that data may be written from the data buffer to the cache and from the cache to the data buffer;
  means for initializing a counter associated with the memory content in the data buffer;
  means for incrementing the counter when the memory content in the data buffer is accessed within a predetermined number of clock cycles;
  means for decrementing the counter when the memory content in the data buffer is not accessed within the predetermined number of clock cycles;
  means for determining that the memory content of the data buffer has a high temporal locality of reference when the counter is above a threshold; and
  means for accessing the data buffer, instead of the cache, for each operation targeting the memory content when the counter is above the threshold.

19. A non-transitory computer-readable medium for accessing memory content with a high temporal locality of reference, comprising:
- at least one instruction for storing the memory content in a data buffer of a processor, the data buffer coupled to a cache of the processor so that data may be written from the data buffer to the cache and from the cache to the data buffer;
- at least one instruction for initializing a counter associated with the memory content in the data buffer;
- at least one instruction for incrementing the counter when the memory content in the data buffer is accessed within a predetermined number of clock cycles;
- at least one instruction for decrementing the counter when the memory content in the data buffer is not accessed within the predetermined number of clock cycles;
- at least one instruction for determining that the memory content of the data buffer has the high temporal locality of reference when the counter is above a threshold; and
- at least one instruction for accessing the data buffer, instead of the cache, for each operation targeting the memory content when the counter is above the threshold.

20. The non-transitory computer-readable medium of claim 19, further comprising:
- at least one instruction for preventing a de-allocation of the memory content in the data buffer when the counter is above the threshold; and
- at least one instruction for storing, when the counter falls below the threshold, the memory content in the cache and de-allocating the data buffer.

21. A non-transitory computer-readable medium for accessing memory content with a high temporal locality of reference, comprising:
- at least one instruction for storing the memory content in a data buffer of a processor, the data buffer coupled to a cache of the processor so that data may be written from the data buffer to the cache and from the cache to the data buffer;
- at least one instruction for determining that a register containing a stack pointer is used as a base register for loads and stores associated with the memory content;
- at least one instruction for setting, in response to the determination that the register containing the stack pointer is used as the base register for loads and stores, a flag associated with the memory content in the data buffer to indicate that the memory content in the data buffer has the high temporal locality of reference; and
- at least one instruction for accessing the data buffer, instead of the cache, for each operation targeting the memory content when the flag indicates that the memory content in the data buffer has the high temporal locality of reference.

22. The non-transitory computer-readable medium of claim 21, further comprising:
- at least one instruction for preventing a de-allocation of the memory content in the data buffer when the flag indicates that the memory content in the data buffer has the high temporal locality of reference.

23. The non-transitory computer-readable medium of claim 21, further comprising:
- at least one instruction for removing the flag indicating the high temporal locality of reference in response to detecting a system event other than a push operation or a pop operation on a stack that causes the stack pointer to change.

24. The non-transitory computer-readable medium of claim 23, further comprising:
- at least one instruction for storing, when the flag is removed, the memory content in the cache and de-allocating the memory content in the data buffer.

25. A processor, comprising:
- a memory structure comprising a data buffer and a cache;
- means for storing memory content in the data buffer, the data buffer coupled to the cache so that data may be written from the data buffer to the cache and from the cache to the data buffer;
- means for determining that a register containing a stack pointer is used as a base register for loads and stores associated with the memory content;
- means for setting, in response to the determination that the register containing the stack pointer is used as the base register for loads and stores, a flag associated with the memory content in the data buffer to indicate that the memory content in the data buffer has a high temporal locality of reference; and
- means for accessing the data buffer, instead of the cache, for each operation targeting the memory content when the flag indicates that the memory content in the data buffer has the high temporal locality of reference.

* * * * *